United States Patent
Scott et al.

(10) Patent No.: US 6,233,704 B1
(45) Date of Patent: *May 15, 2001

(54) SYSTEM AND METHOD FOR FAULT-TOLERANT TRANSMISSION OF DATA WITHIN A DUAL RING NETWORK

(75) Inventors: Steven L. Scott, Eau Claire; Steven M. Oberlin, Chippewa Falls; Daniel L. Kunkel, Chippewa Falls; Gerald A. Schwoerer, Chippewa Falls, all of WI (US)

(73) Assignee: Silicon Graphics, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/614,860

(22) Filed: Mar. 13, 1996

(51) Int. Cl.⁷ .................................................. G06F 13/00

(52) U.S. Cl. ......................... 714/717; 709/200; 709/203; 709/208; 709/210; 709/251; 714/4; 714/43; 714/56; 714/712

(58) Field of Search .................... 714/4, 43, 56, 714/712, 717, 713; 712/3, 33, 38, 39, 57, 58; 709/200, 203, 208, 209, 210, 220, 251

(56) References Cited

U.S. PATENT DOCUMENTS

| | | | |
|---|---|---|---|
| 4,803,620 | * 2/1989 | Inagami et al. | 712/203 |
| 4,845,710 | 7/1989 | Nakamura et al. | 370/110.1 |
| 4,866,704 | * 9/1989 | Bergman | 370/85.4 |
| 5,191,656 | * 3/1993 | Forde, III et al. | 395/325 |
| 5,195,100 | 3/1993 | Katz et al. | 371/66 |
| 5,233,618 | 8/1993 | Glider et al. | 371/68.1 |
| 5,274,799 | 12/1993 | Brant et al. | 395/575 |
| 5,289,470 | 2/1994 | Chang et al. | 370/94.1 |
| 5,303,244 | 4/1994 | Watson | 371/10.1 |
| 5,345,565 | 9/1994 | Jibbe et al. | 395/325 |
| 5,381,534 | * 1/1995 | Shi | 395/200 |
| 5,390,188 | * 2/1995 | Dawson | 371/20.6 |
| 5,402,428 | 3/1995 | Kakuta et al. | 371/10.1 |
| 5,432,784 | 7/1995 | Ozveren | 370/60.1 |
| 5,452,330 | 9/1995 | Goldstein | 375/257 |
| 5,452,444 | 9/1995 | Solomon et al. | 395/182.04 |
| 5,457,683 | * 10/1995 | Robins | 370/60 |

(List continued on next page.)

OTHER PUBLICATIONS

Gustavson, D B, "the Scalable Coherent Interface and Related Standards Projects", *IEEE Micro*, 10–22, (Feb., 1992).

"IEEE Standard for Scalable Coherent Interface (SCI)", *IEEE Std 1596–1992*, 1–248, (Mar., 1992).

Patterson, D A, et al., "A Case For Redundant Arrays Of Inexpensive Disks (RAID)", *University of California at Berkeley, Report No. UCB/CSD 87/391*, (Dec. 1987).

Scott,S, "The SCX Channel: A New, Supercomputer–Class System Interconnect", *HOT Interconnects III*, Abstract, pp. 1–11, (Aug. 1–11, 1995).

*Primary Examiner*—Daniel H. Pan
*Assistant Examiner*—Dzung C Nguyen
(74) *Attorney, Agent, or Firm*—Schwegman, Lundberg Woessner & Kluth, P.A.

(57) ABSTRACT

A multiple counter-rotating ring computer network system having a permission control scheme for client isolation. The peripheral channel allows two rings to be folded into one longer ring so that faulty nodes can be effectively removed from the network. Or, any of the rings can be masked so that they are unoperational. The network system also allows several client isolation states ranging from complete isolation to master access. These types of isolation allow faulty client devices to be tested while maintaining a high-level of network security by configuring the client to an appropriate isolation state.

21 Claims, 7 Drawing Sheets

U.S. PATENT DOCUMENTS

| | | | | |
|---|---|---|---|---|
| 5,499,275 | * | 3/1996 | Kishi | 712/203 |
| 5,499,337 | | 3/1996 | Gordon | 395/182.04 |
| 5,513,192 | | 4/1996 | Janku et al. | 371/50.1 |
| 5,519,844 | | 5/1996 | Stallmo | 395/441 |
| 5,522,031 | | 5/1996 | Ellis et al. | 395/182.04 |
| 5,530,948 | | 6/1996 | Islan | 395/182.04 |
| 5,590,124 | * | 12/1996 | Robins | 370/258 |
| 5,594,869 | * | 1/1997 | Hawe et al. | 395/200.2 |
| 5,617,409 | | 4/1997 | Ozveren et al. | 370/235 |
| 5,617,570 | * | 4/1997 | Russell et al. | 395/684 |
| 5,619,645 | * | 4/1997 | Montenegro et al. | 395/185.01 |
| 5,638,448 | * | 6/1997 | Nguyen | 380/29 |
| 5,659,721 | * | 8/1997 | Shen et al. | 395/569 |
| 5,751,696 | * | 5/1998 | Bechtel et al. | 370/223 |
| 5,838,993 | * | 11/1998 | Riley et al. | 395/842 |

* cited by examiner

SYSTEM AND METHOD FOR FAULT-TOLERANT TRANSMISSION OF DATA WITHIN A DUAL RING NETWORK

FIELD OF THE INVENTION

The present invention relates to computer systems and in particular to highly interconnected dual ring computer network systems.

BACKGROUND

Modular, highly interconnected computer network systems offer the ability to exchange data among individual nodes in the network and to share hardware resources. Due to the large amount of data movement in such a system, communication traffic among the nodes can become congested. Some methods for reducing congestion have been proposed. One, the Scalable Coherent Interface increases throughput through the network by sending data in self-contained packets which have the needed address, command and data. That way, processors don't have to wait for each message to travel the length of the network before sending the next one. The Scalable Coherent Interface (SCI) is an IEEE Standard (IEEE Std 1596-1992). [David B. Gustavson, The Scalable Coherent Interface and Related Standards Projects, IEEE Micro, February 1992, p. 10].

The Scalable Coherent Interface is a single ring network which can be implemented on a range of systems, from smaller personal computer based networks to huge, interconnected network systems. Since it is a single ring system, however, the network is not tolerant to failures in the network hardware. For example, although the Scalable Coherent Interface has the feature that a blocked node only blocks packets destined to that node while not blocking packets destined elsewhere, this protocol relies on having a fully connected ring network. Breaking the ring in order to add, to remove, or to swap a node interrupts the Scalable Coherent Interface.

On the other hand, the Fiber Distributed Data Interface (FDDI) provides fault tolerance by using a dual-ring configuration. One of these rings is used for the data traffic. The secondary ring can be used to fold the communications ring around a faulty network node. This allows the network to remain functional without needing to physically replace the faulty node.

Even on a dual ring network such as FDDI, the process of testing faulty nodes in the network can be troublesome. As long as the faulty node remains on the network, that node can cause damage both to data kept on network storage devices and to the communication flowing through the node on the network.

There is a need in the art for a ring-based computer network which can increase the transfer rate of data. At the same time, there is a need for a computer network that can expand in a cost-efficient manner and one which is highly fault tolerant. This network should allow faulty nodes to be partially disabled so that the network is not harmed by such faults and so that the nodes can be tested and debugged without needing to remove them from the network. There should also be the ability to add, remove, or swap nodes while the rest of the network can continue to function normally.

SUMMARY OF THE INVENTION

The present invention is a computer network system with multiple, counter-rotating rings. The network is made up of nodes which consist of a client computer attached to the network by an interface device. The interface device provides input and output ports to the client computer as well as input and output ports to the network rings. The interface device has a plurality of buffers. One set, the receive buffers, accept data packets from the network to be passed along to the client computer. The other set, the send buffers, accumulate and send data packets from the client computer out to the network. The interface device also has a plurality of bypass buffers and reversers. The bypass buffers allow the node to accept a data packet addressed to another node and hold the packet until it can be routed to the next neighboring node. The reversers allow the plurality of rings to be folded into larger rings in order to route network data around faulty nodes. Memory mapped registers are used to mask out entire rings when necessary.

The interface device also provides a client isolation device which allows the client computers to have multiple types of connectivity to the computer network. Client computers which are faulty, for example, can be isolated and given very limited connectivity. On the other hand, a client computer acting as a network supervisor, can be given full connectivity to the network.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that changes may be made without departing from the spirit and scope of the present invention. The following Detailed Description is, therefore, not to be taken in a limiting sense and the scope of the present invention is defined by the appended claims.

Figure 1:
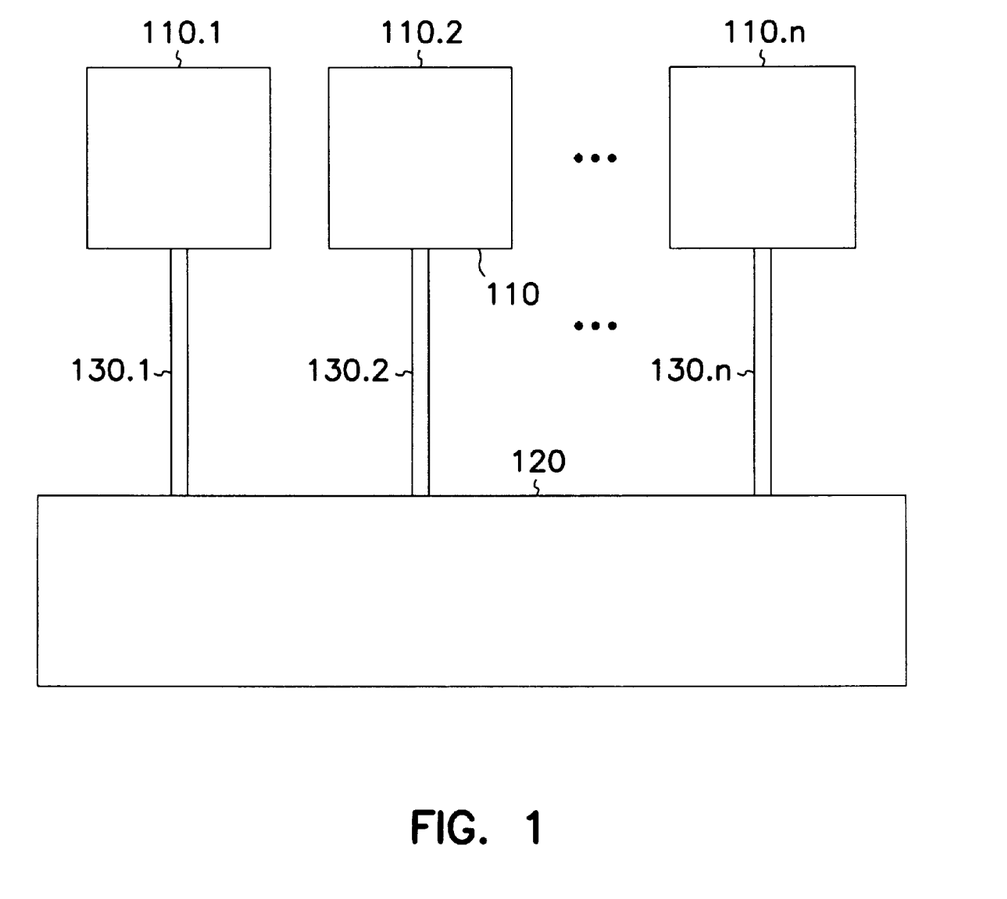
FIG. 1 is a block diagram of a plurality of client computers connected across a network.
Figure 2:
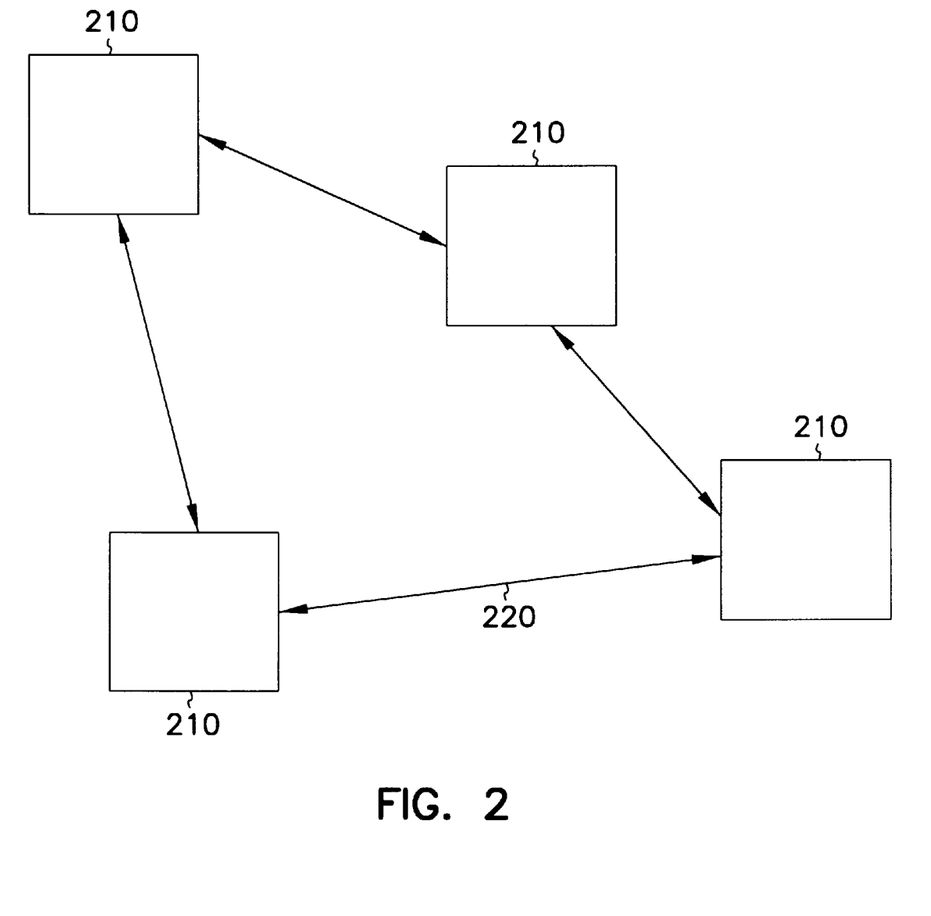
FIG. 2 is a block diagram of a ring network topology which could be used in the system of FIG. 1.

FIG. 1 shows a generic computer network system comprising a plurality of computer devices, called nodes 110, connected to the network 120 by a communication line 130. FIG. 2 demonstrates one possible topology of such a computer network system. Here, the nodes 210 are connected by the communication line 220 to form a ring network. Packets can be sent in either direction on communication line 220. Communication line 220 may be any type of transmission media, including twisted pair, coaxial cable or optical fiber. Having data moving in both directions along the communication lines does, however, require a high level of management to avoid data collisions.

Figure 3:
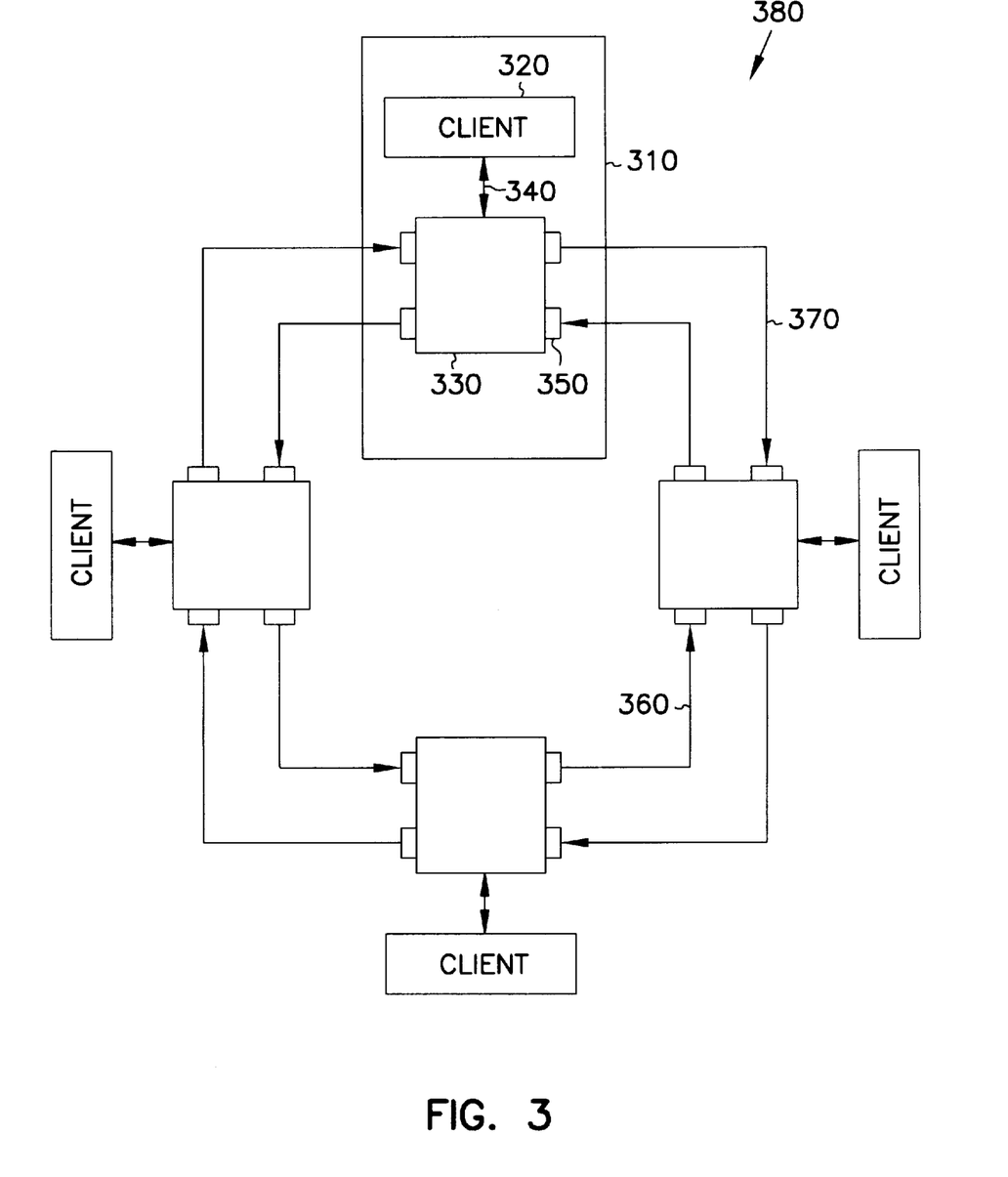
FIG. 3 shows one embodiment of a peripheral channel. In this illustration, the invention is shown with four nodes.

One way to decrease the amount of traffic management required is to implement communication line 220 as two separate unidirectional lines. This approach is shown in FIG. 3. FIG. 3 shows a dual ring peripheral channel 380 in which traffic moves clockwise on one ring and counter-clockwise on the other ring. This substantially decreases the policing necessary on the communication line since all data is travelling in the same direction single-file. The redundancy provided by the double rings and their counter rotating orientation provide the ability to continue operation during addition, removal or hot swaps of client nodes or in the presence of a faulty link or node. This makes the network highly fault tolerant.

Peripheral channel 380 includes a number of nodes 310 connecting to each other by counter-rotating rings 360 and 370. Each node 310 includes a client 320 and an Interface Device 330. In one embodiment, Interface Device 330 can be implemented as a single ASIC. Interface Device 330 could also be implemented as a computer board or as an external device connecting the client and peripheral channel 380 via cable. Client 320 may be a standalone computer or workstation. Client 320 could also be a peripheral device such as a disk array. In one system, client computer 320 communicates with bulk memory devices across peripheral channel 380. In another embodiment, a massively parallel processing system (MPP) communicates with other computer systems and with bulk memory across peripheral channel 380. In such an embodiment, interface device 330 is connected to processors within the MPP systems via an I/O Controller. Such an I/O controller is described in "INPUT/OUPUT SYSTEM AND METHOD FOR A MASSIVELY PARALLEL PROCESSOR," U.S. patent application Ser. No. 08/614,859, filed herewith, the description of which is hereby incorporated by reference. In one embodiment, Interface Device 330 contains a 32-bit wide channel port 350 for each of the dual network channels and a 64-bit bidirectional client port interface 340 for communication with client 320. In one embodiment, rings 360 and 370 are implemented the same way that a single ring is implemented in a Scalable Channel Interface. Other methods of interconnection could also be used without departing from the scope of the invention.

In one embodiment, rings 360 and 370 are used for active data traffic. They operate independently and interact only at the port interfaces. Traffic does not switch between the two rings. Having two active rings increases the rate of data transfer over that of a single ring network.

Figure 4:
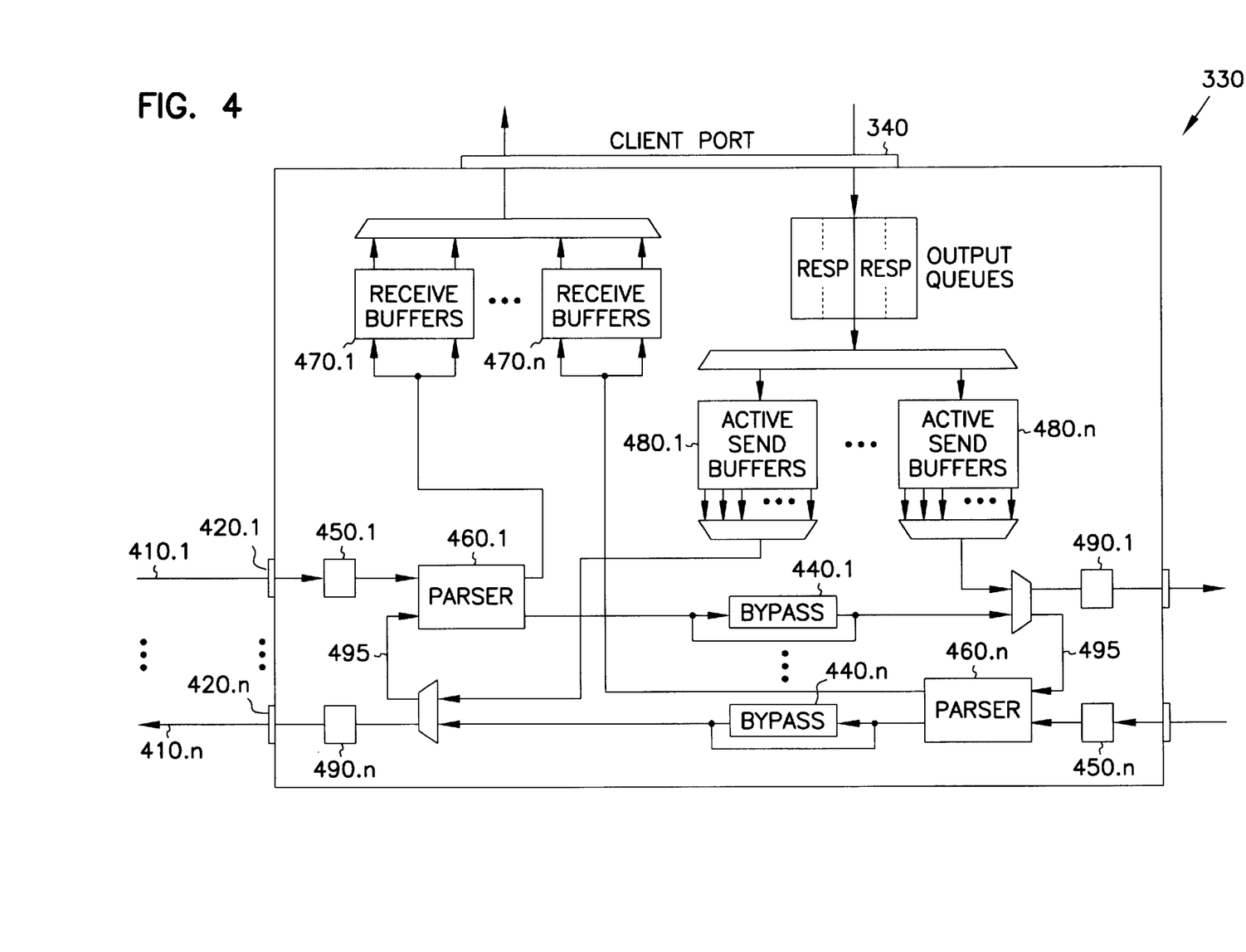
FIG. 4 shows a block diagram of one embodiment of the present invention's interface device.

FIG. 4 is a block diagram of one embodiment Interface Device 330. Since peripheral channel 380 can be implemented with any number of rings, FIG. 4 shows n interface channels, each with its own packet buffering. Network channels 410 connect to Interface Device 330 via channel input and output ports 420. Client 320 is connected to Interface Device 330 via bidirectional client port 340.

The traffic in peripheral channel 380 is organized into packets, which are sent from a source node to a target node. A packet is transmitted on one of the n channel rings, passing through the intermediate nodes, until it reaches its target node. The target node removes the packet from the channel and replies with an echo packet. The source node retains a copy of the send packet until it receives the corresponding echo packet. The echo informs the source whether the send packet was successfully received at the target node or was busied. If the packet was accepted, then the source node releases the buffer space consumed by the send packet. If the packet was busied, then the source node retransmits the send packet.

If a node is sending out its own packet when a packet arrives addressed to another node then the arriving packet is stored in a bypass buffer 440 which can store a maximum-sized packet. Interface Device 330 is prohibited from sending a source packet unless its bypass buffer is empty. This prohibition applies on a per ring basis. Thus, although Interface Device 330 may be prohibited from sending on one ring, it may still be able to send on another of the rings. A node is always able to receive packets passing through the node; the node will either pass the packet directly onto the ring output, or the incoming packet will be stored in the bypass buffer and will then be passed along as soon as the current packet has been sent.

Packets coming into the node's Interface Device 330 first go through phase corrector and decoder 450 to align the packets with the Interface Device environment. The packets are then interpreted by parser 460 and either passed through the node or stripped by Interface Device 330 and routed into receive buffers 470. Packets arriving from client 320 are assembled in an active send buffer 480 and pass through the encoder 490 before entering peripheral channel 380 itself. Interface Device 330 also has a reverser 495 which allows a packet moving along one ring to be reversed and placed on another ring.

In one embodiment, peripheral channel 380 and Interface Device 330 are configured for a dual-ring system. In such an embodiment, n=2 and Interface Device 330 is substantially as shown in FIG. 4.

Reliability and Reconfiguration of the Peripheral Channel

In one embodiment, diagnostic software identifies the hard faults on the network and reconfigures the channel. Several kinds of reconfiguration are possible. For faulty links, or errors in the circuitry of a single ring on a node's Interface Device 330, one of the two counter-rotating rings 360 or 370 can be disabled. All traffic is then routed on the other ring.

Figure 5:
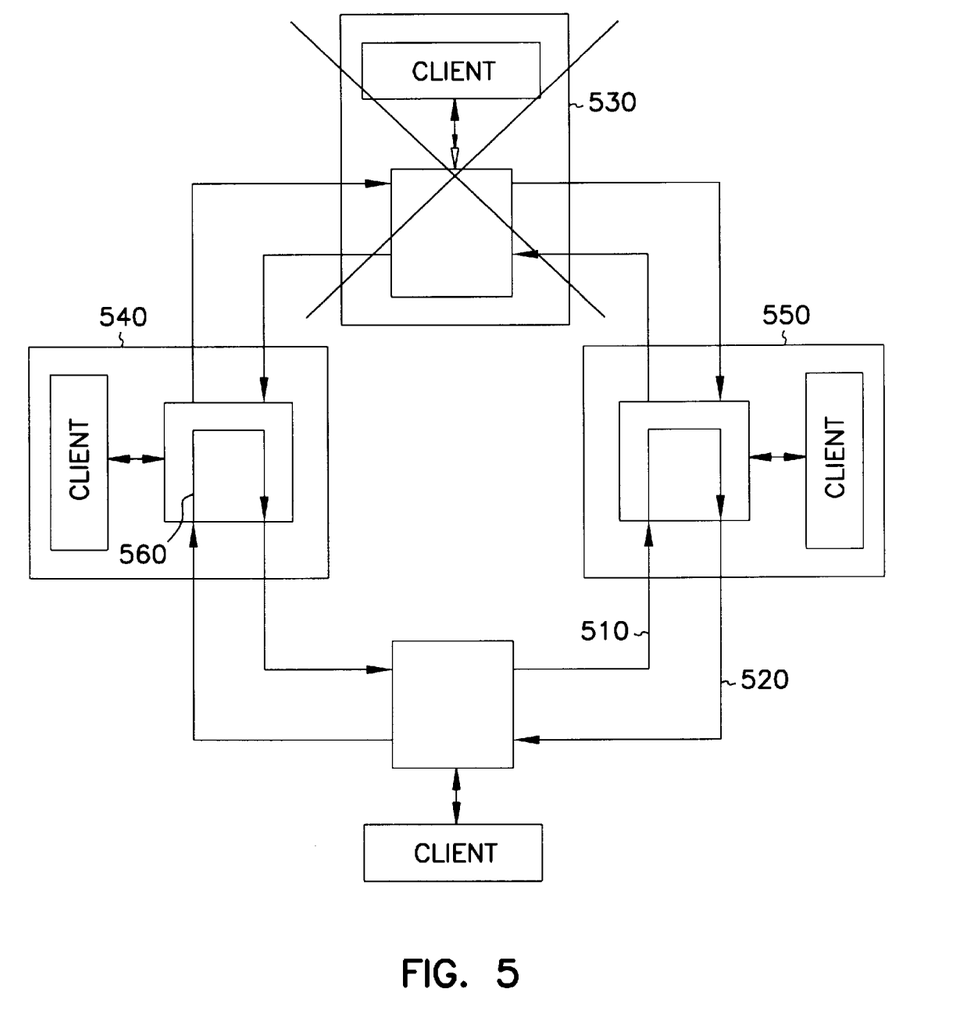
FIG. 5 is a block diagram illustrating the concept of folding the dual rings around a faulty node.

For faulty node Interface Devices 330 (as well as during hot swaps of clients), the two counter-rotating peripheral channel rings can be folded together to map out the bad node. FIG. 5 shows one method used by peripheral channel 380 to provide for fault tolerance. Again, peripheral channel 380 consists of a number of counter-rotating communication lines, of which two are shown in this figure 510 and 520. When a node 530 faults out, then its two neighboring nodes 540 and 550 can use the Reverser 495 (as illustrated in FIG. 4) to form communication lines into a folded ring 560 around the faulty node. Nodes on the folded ring still retain both ring interfaces and thus will respond to packets sent on either ring, even though the rings are in fact folded into a single ring. This folding ability gives peripheral channel 380 a level of fault tolerance not available with single ring network systems.

In one embodiment, each node 110 has a series of memory-mapped registers (MMRs). (In one embodiment of the circuit of FIG. 3, the MMRs are provided as part of Interface Device 330.) All control and configuration of the network channel is done via writes to these MMRs. These MMRs provide another method of fault tolerance, namely ring masking. Whereas ring folding consists of folding out a node from the network by folding the dual rings into a single ring, ring masking consists of completely disabling one or both of the rings. Ring masking is accomplished via writes to MMRs. Such MMRs indicate whether the network is operating in normal dual-ring operation, whether the first ring is mask as unoperational, whether the second ring is masked as unoperational, or whether both rings are masked. Masking both rings is useful for temporarily uieting the network before performing a hot swap of a node.

Folding the rings allows a faulty client computer to be detached from peripheral channel 380. Masking a ring allows the entire ring to become unavailable. But folding or masking a ring decreases the channel bandwidth by approximately a factor of two. In one embodiment, therefore peripheral channel 380 has an additional fault protocol: faulty client computers can be isolated from the network. Client maintenance can then be performed over the channel while preventing the client from interfering with other network nodes. The channel retains its full bandwidth while any number of client nodes are isolated.

Client Isolation

Figure 6A:
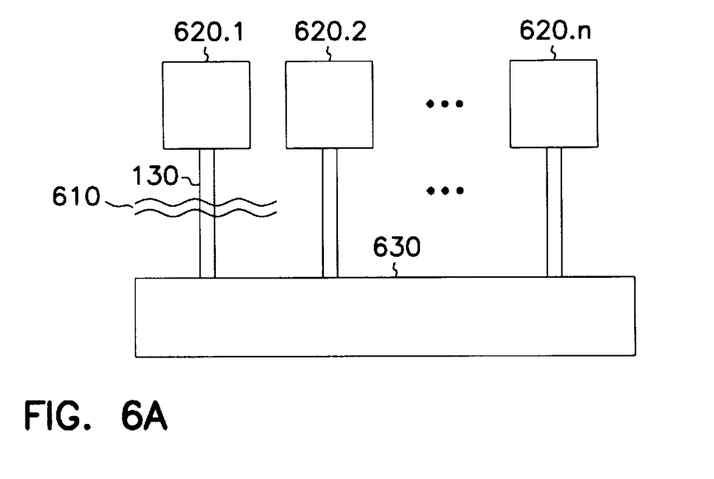
FIG. 6 is a diagram which offers a way to conceptualize the ability to isolate clients from a peripheral channel.
Figure 6B:
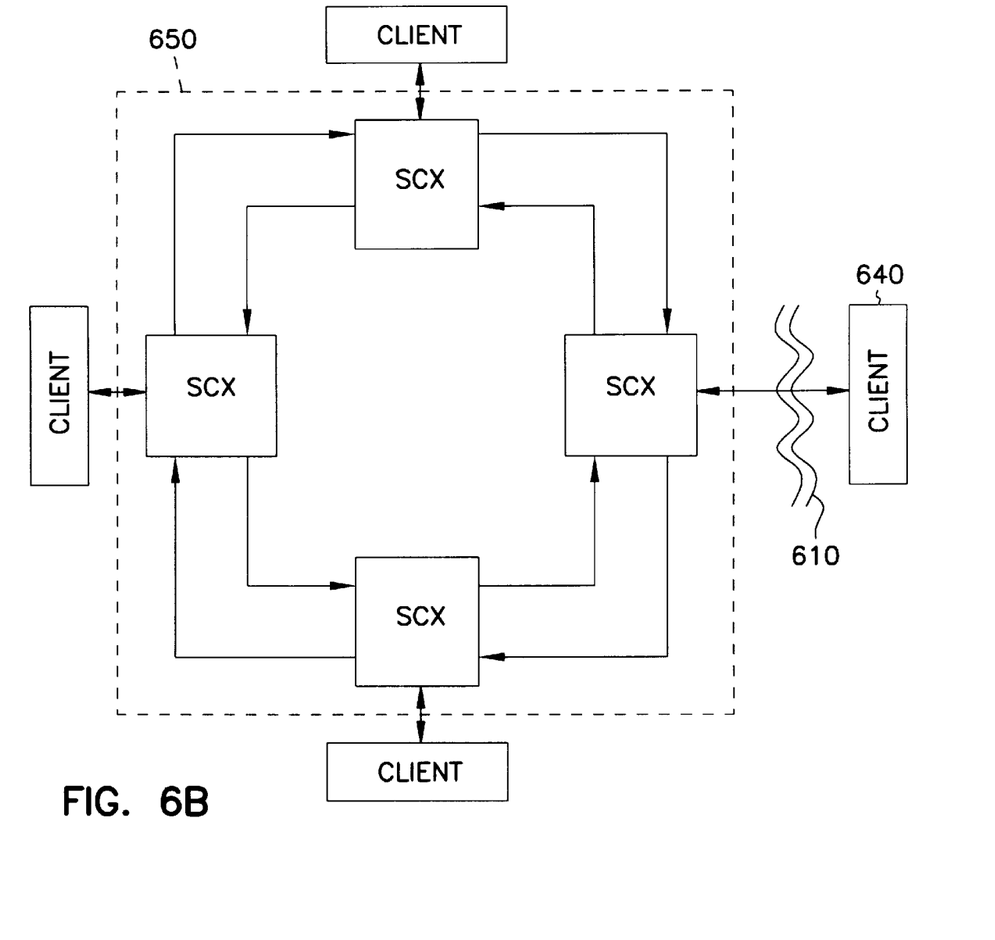

Client isolation can also be used on network topologies such as that shown in FIG. 1 to isolate faulty clients from networks 120. FIGS. 6a and 6b illustrate the concept of client isolation. In effect, a virtual membrane 610 is constructed between nodes 620 and network 630 or between client 640 and peripheral channel 650. In one embodiment, this virtual membrane can be changed to one of six states; each state possessing distinct client and network access permissions. Thus, each isolation state can be thought of as offering a different degree of opaqueness between the network and the faulty client computer.

The membrane's most transparent state is MASTER. The MASTER state allows full permission for the client device to control the network. All functioning nodes on the network may be set to MASTER state, or only a single node, called the channel master, may be set to MASTER. The channel master initializes the other nodes and performs all maintenance on the network system.

The next membrane isolation state is USER. The USER state is equivalent to the MASTER state, except that the client is prohibited from reconfiguring the other nodes. Should the client device send a request for reconfiguration, the membrane works as a firewall to ensure that the command is not passed into the network.

The third membrane state is SLAVE. When isolated in the SLAVE state, a client device can respond to requests from the network but cannot initiate any activity on the network itself. This membrane state is useful for booting or otherwise manipulating a healthy client device before granting it USER or MASTER access.

The last three states are the most restrictive ones: MAINTENANCE, STANDBY and ISOLATE. When a client is faulty, the membrane can be configured to MAINTENANCE state. Once isolated in this fashion, another network client can perform debugging on the node without the possibility that the corrupted node will initiate a packet transfer that may harm the network or corrupt data in other clients' memory. In STANDBY and ISOLATE modes, the membrane is completely opaque, mapping out the node from the network. STANDBY mode allows the node a single avenue of gaining access back to the network. A client device in STANDBY mode can increase its access to the peripheral channel by writing a specific key code into a special memory mapped register. In ISOLATE mode, no such access recourse exists. The only way a client in ISOLATE mode can become less isolated is by another the assistance of another node which is in MASTER state.

Configuring the Isolation State

As previously mentioned, in one embodiment, each node 110 has a series of memory-mapped registers (MMRs). (In one embodiment of the circuit of FIG. 3, the MMRs are provided as part of Interface Device 330.) All control and configuration of the network channel is done via writes to these MMRs. Channel status is obtained via reads of these MMRs. One of the MMRs is the PORT_ACCESS register, which controls the degree of isolation of the client port.

Client node 110 can read the isolation status of another client node 110 by issuing a MMR_Read packet. This causes the client node in question to return its isolation status, stored in the PORT_ACCESS register, in a MMR_ReadResp packet. The first client can then issue a MMR_Write packet to change the second client's isolation state. Such a change in isolation will return a MMR_WriteResp packet.

For example, Client 110.2 could send a MMR_Read packet to Client 110.n. Client 110.n would receive the packet and respond with a MMR_ReadResp Packet to Client 110.2 stating that Client 110.n's isolation state is MAINTENANCE. If Client 110.2 was in MASTER mode itself, then it could then send a MMR_Write packet to Client 110.n instructing it to change its isolation state to ISOLATE. When Client 110.n receives this packet, it would change its isolation state and respond with a MMR_WriteResp packet.

Figure 7:
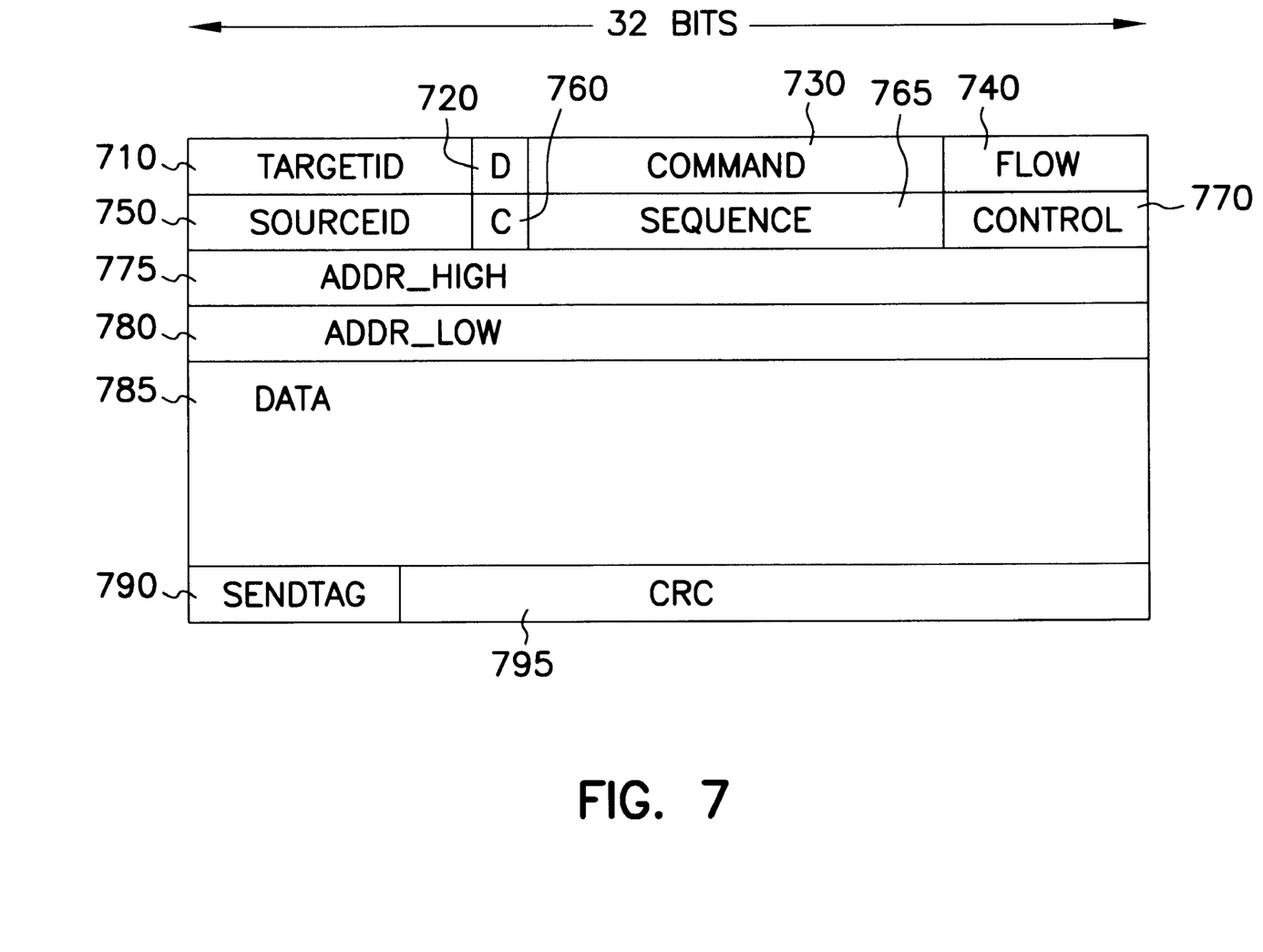
FIG. 7 is a diagram of a format of which can be used for creating send packets to be used on a peripheral channel.

These four MMR write and read command packets could be implemented in several ways. One embodiment of a packet which could be used is shown in FIG. 7. In one such embodiment, a packet consists of: a 13-bit TargetID 710 which identifies the node the packet is addressed to; a 1-bit Delta flag 720 indicating whether the TargetID is an absolute address or a delta address; a 13-bit Command field 730 which includes the opcode of the specific read or write command (in which in one embodiment, the opcode for MMR_Read is 000000, for MMR_ReadResp is 100000, for MMR_Write is 010000 and for MMR_WriteResp is 110000); a 5-bit Flow field 740, a 13-bit SourceID 750 which identifies the packet's originator; a 1-bit Corrupt flag 760 which indicates whether the packet is known to be corrupted; a 13-bit Sequence field 765 which is used by clients to match response packets with their corresponding request packets; a 5-bit Control field 770 used to specify on which of the n rings to dispatch the packet, the packet's priority and whether the packet must be delivered in order; 32-bit high and low addresses 775 and 780 used to indicate the address of the MMR; an optional Data field 785 which is used to indicate the Isolation Membrane status for MMR_Write and MMR_ReadResp packets; a 8-bit Send Tag 790 indicating the active send buffer; and a 16-bit CRC 795 used by Interface Device 330 to detect corruption of the packet contents during transmission.

Use of Isolation States During Network Initialization

One important use of the client isolation function is during network initialization. Some embodiments of peripheral channel 380 may be designed so that only a single client is set to MASTER isolation mode. This client node is called the channel master. The channel master is responsible for verifying channel integrity, assigning node IDs and enabling client nodes. The channel master might also be charged with diagnosing and reconfiguring a faulty channel and booting other clients. In such an embodiment, upon power on, the client ports start in STANDBY isolation mode. STANDBY mode isolates the clients from the network until the channel master reconfigures the clients' PORT_ACCESS MMRs. This is done at the end of the network initialization procedure.

Other embodiments of the present invention are possible without departing from the scope and spirit of the present invention. Other embodiments of the invention could provide for a larger number of communication rings. Still other embodiments could provide for a different number of membrane states, each possessing certain access permissions.

Although specific embodiments have been illustrated and described herein, it will be appreciated by those of ordinary skill in the art that any arrangement which is calculated to achieve the same purposes may be substituted for the specific embodiment shown. This application is intended to cover any adaptations or variations of the present invention. Therefore, it is manifestly intended that this invention be limited only by the claims and the equivalents thereof.

We claim:

1. A computer network system, comprising:
   a first and a second ring network; and
   a plurality of network nodes, wherein each network node is connected to said first and second ring networks and wherein each network node comprises:
      a client computer which communicates with packet data; and
      an interface device, wherein the interface device comprises:
         a plurality of input and output channel ports wherein each input channel port is connected to one of said first and second ring networks and wherein each output channel port is connected to one of said first and second ring networks;
         a plurality of input and output client ports connecting the interface device to the client computer;
         a plurality of receive buffers which accept packet data from the plurality of input channel ports;
         a plurality of send buffers which accumulate and then transmit data to the plurality of output channel ports;
         a plurality of bypass buffers, wherein each bypass buffer is connected between one of the plurality of input channel ports and one of the plurality of output channel ports, wherein each bypass buffer is capable of storing a packet arriving from another network node until it can be transmitted on the output channel port to which the bypass buffer is connected; and
         a plurality of channel port reversers which interconnect the plurality of input channel ports to the plurality of output channel ports and which allow each network node to be folded out of the computer network system.

2. The computer network system, as recited in claim 1, wherein the interface device further comprises a ring masker having a plurality of discrete masking states, including a first masking state, wherein the first masking state makes a set of the plurality of input and output channel ports inaccessible for packet data transmission.

3. The computer network system, as recited in claim 1, wherein the interface device further comprises a client isolator having a plurality of discrete isolation states to isolate the client computer from the computer network system.

4. The computer network system, as recited in claim 3, wherein the client isolator performs the steps of:
   defining an isolation state from the plurality of discrete isolation states for the network node;
   receiving a client message from the client computer; and
   if the isolation state allows the client computer to access the network system, dispatching the client message to the network system.

5. The network according to claim 1, wherein the first and second ring networks form a pair of counter-rotating rings.

6. A client isolator on a computer system having a plurality of client computers, including a first and a second client computer connected across a network, the client isolator comprising:
   a request receiver which accepts a data request from the first client computer;
   a request dispatcher which transmits the data request to the network;
   a status indicator which performs the tasks of:
      defining an isolation state for the first client computer;
      determining if the isolation state allows the client computer to access the network; and
      if the isolation state allows the first client computer to access the network,
   dispatching the data request from the first client computer to the network; and
   means for receiving a message from the second client computer changing the isolation state of the first client computer.

7. A method for client isolation on a computer system having a plurality of client computers, including a first and a second client computer connected across a network, the method comprising the steps of:
   defining an isolation state for the first client computer;
   receiving a client message from the first client computer;
   determining if the isolation state allows the first client computer to access the network;
   if the isolation state allows the client computer to access the network, dispatching the client message to the network; and
   receiving a message from the second client computer changing the isolation state of the first client computer.

8. The method according to claim 7, wherein the step of receiving a message from the second client computer includes the step of writing a value representative of an isolation state into a memory-mapped register.

9. A fault-tolerant ring network, comprising:
   a first ring network;
   a second ring network; and
   a plurality of network nodes, wherein each network node includes:
      a first input channel port connected to the first ring network;
      a first output channel port connected to the first ring network;
      a second input channel port connected to the second ring network;
      a second output channel port connected to the second ring network; and
      first and second channel port reversers, wherein the first channel port reverser is connected between the first input channel port and the second output channel port so traffic received from the first ring network can be transferred to the second ring network and wherein the first channel port reverser is connected between the second input channel port and the first output channel port so traffic received from the second ring network can be transferred to the first ring network, the first and second channel port reversers, when enabled, acting to fold the first ring network into the second ring network.

10. The network according to claim 9, wherein the first and second ring networks form a pair of counter-rotating rings.

11. The network according to claim 10, wherein each node further includes one or more memory-mapped registers, wherein one of the memory-mapped registers includes a ring masking entry, wherein the ring masking entry selectively disables said first and said second ring networks.

12. A fault-tolerant ring network, comprising:
   a first ring network;

a second ring network; and a plurality of network nodes, wherein each network node includes:
- a first input channel port connected to the first ring network;
- a first output channel port connected to the first ring network;
- a second input channel port connected to the second ring network;
- a second output channel port connected to the second ring network;
- first and second channel port reversers, wherein the first channel port reverser is connected between the first input channel port and the second output channel port so traffic received from the first ring network can be transferred to the second ring network and wherein the first channel port reverser is connected between the second input channel port and the first output channel port so traffic received from the second ring network can be transferred to the first ring network, the first and second channel port reversers, when enabled, acting to fold the first ring network into the second ring network; and
- one or more memory-mapped registers, wherein one of the memory-mapped registers includes a ring masking entry, wherein the ring masking entry selectively disables said first and said second ring networks.

13. A fault-tolerant ring network, comprising:

a first ring network;

a second ring network; and a plurality of network nodes, wherein each network node includes:
- a first input channel port connected to the first ring network;
- a first output channel port connected to the first ring network;
- a second input channel port connected to the second ring network;
- a second output channel port connected to the second ring network;
- first and second channel port reversers, wherein the first channel port reverser is connected between the first input channel port and the second output channel port so traffic received from the first ring network can be transferred to the second ring network and wherein the first channel port reverser is connected between the second input channel port and the first output channel port so traffic received from the second ring network can be transferred to the first ring network, the first and second channel port reversers, when enabled, acting to fold the first ring network into the second ring network; and
- one or more memory-mapped registers, wherein one of the memory-mapped registers includes a isolation status entry, wherein the isolation state entry selects one of a plurality of isolation states.

14. The network according to claim 13, wherein the plurality of isolation state entries include a user state and an isolate state, wherein a node in the user state has full access to the first and second ring networks and wherein a node in the isolate state is prevented from accessing the first and second ring networks.

15. The network according to claim 14, wherein one of the memory-mapped registers includes a ring masking entry, wherein the ring masking entry selectively disables said first and said second ring networks.

16. The network according to claim 14, wherein the plurality of isolation state entries further include a master state and a slave state, wherein a node in the master state has full access to the first and second ring networks and can configure other nodes and wherein a node in the slave state can respond to requests from the first and second ring networks but cannot initiate any activity on the first and second ring networks.

17. The network according to claim 16, wherein the plurality of isolation state entries further include a maintenance state and a standby state, wherein a node in the maintenance state responds to debug commands from other nodes but cannot initiate packet transfer.

18. A computer system, comprising:

a plurality of computers, including a first and a second computer; and a network connecting the plurality of computers;

wherein each computer includes a three or more isolation states, including a MASTER isolation state, wherein each isolation state provides a different level of opaqueness between the computer and the network; and wherein, when the first computer is in MASTER isolation state, it controls the isolation state of the second computer.

19. The system according to claim 18, wherein each computer includes a memory-mapped register used to store a value representative of its isolation state.

20. The system according to claim 18, wherein a computer in MASTER isolation state reads the isolation state of other computers on the network.

21. The system according to claim 18, wherein the isolation states further include a USER state, a SLAVE state and an ISOLATE state, wherein a computer in USER state is able to read but cannot control the isolation state of another computer on the network, wherein a computer in SLAVE can respond to requests from the network but cannot initiate any activity on the network itself, and wherein a computer in ISOLATE state cannot initiate or respond to activity on the network except when being addressed by another computer in MASTER isolation state.

* * * * *

UNITED STATES PATENT AND TRADEMARK OFFICE
CERTIFICATE OF CORRECTION

PATENT NO. : 6,233,704 B1
DATED : May 15, 2001
INVENTOR(S) : Steven L. Scott, Steven M. Oberlin, Daniel L. Kunkel and Gerald A. Schwoerer It is certified that error appears in the above-identified patent and that said Letters Patent is hereby corrected as shown below:

Column 4,
Line 2, insert -- , -- after "node".
Line 66, delete "uieting" and insert -- quieting --, therefor.

Column 8,
Line 4, insert -- , wherein each computer includes three or more isolation states and each isolation state provides a different level of opaqueness between the computer and the network --, after "computer".

Column 8,
Line 19, insert -- , wherein each computer includes three or more isolation states and each isolation state provides a different level of opaqueness between the computer and the network --, after "computer".

Signed and Sealed this

Thirtieth Day of July, 2002

*Attest:*

JAMES E. ROGAN
*Director of the United States Patent and Trademark Office*

*Attesting Officer*